United States Patent [19]

Recton

[11] Patent Number: 5,381,727
[45] Date of Patent: Jan. 17, 1995

[54] SAUCEPAN, IN PARTICULAR A TYPE OF FRYING PAN

[76] Inventor: Marc Jean-Marie Recton, 178, Rue Jeanne d'Arc, 75013 Paris, France

[21] Appl. No.: 134,997

[22] Filed: Oct. 12, 1993

[30] Foreign Application Priority Data

Oct. 13, 1992 [FR] France ............... 92 12228

[51] Int. Cl.6 ........................... A47J 37/10
[52] U.S. Cl. ........................... 99/423; 99/425; 220/912
[58] Field of Search .................. 99/334–336, 99/410, 415, 422, 423, 425, 443 R, 444, 446, 432, DIG. 15; 220/912

[56] References Cited

U.S. PATENT DOCUMENTS

| 192,946 | 7/1877 | Smith | 99/336 |
|---|---|---|---|
| 284,051 | 8/1883 | O'Brien et al. | 99/336 |
| 820,034 | 5/1906 | Anderson | 99/336 |
| 1,198,374 | 9/1916 | Overbury | 99/410 |
| 1,255,014 | 1/1918 | Janiszewski | 99/410 |
| 1,465,508 | 8/1923 | Carpenter | 99/334 |
| 2,544,846 | 3/1951 | Mach | 99/355 |
| 2,898,905 | 8/1959 | Thomas | 126/374 |
| 3,200,737 | 8/1965 | Ferenc | 99/444 |
| 4,103,604 | 8/1978 | Berard | 99/403 |
| 4,773,318 | 9/1988 | Furletti | 99/424 |
| 4,832,226 | 5/1989 | Leon | 99/403 |

FOREIGN PATENT DOCUMENTS 403805 11/1909 France .

*Primary Examiner*—Mark Spisich
*Attorney, Agent, or Firm*—Seidel, Gonda, Lavorgna & Monaco

[57] ABSTRACT

A saucepan is provided which includes a base (1) delimited at its periphery by a rim (2), and a plate (4) arranged against the inner surface of the saucepan's base. The saucepan further includes a device which moves the plate away from the base. This moving device is actuated by a control member and is located between the plate and the base.

14 Claims, 2 Drawing Sheets

SAUCEPAN, IN PARTICULAR A TYPE OF FRYING PAN

The saucepan according to the invention comprises a base which is delimited at its periphery by a rim, and is characterised in that it comprises a plate which is arranged against the inner face of the base of the saucepan, means actuated by a control member being provided between the plate and the base to move the plate away from the base.

According to another feature of the invention, the means actuated by the control member are constituted, on the one hand, by a spring which acts in such a way as to move the plate away from the base, and, on the other hand, by a cam ramp and finger, one of which is provided on the base and the other of which is provided on the plate, to enable the plate to be simultaneously lifted up and rotated.

According to another feature of the invention, means are provided on the saucepan and on the plate to lock them together, the control member acting on these locking means in such a way as to release the plate and to enable it to be simultaneously lifted up and rotated.

According to another feature of the invention, abutment means are provided to restrict the simultaneous rotational and lifting movements of the plate, the abutment means comprising at least one recess which cooperates with set-off portions, one of which is provided on the base and the other of which is provided on the plate.

The invention is shown by way of non-limitative example in the accompanying drawings, wherein.

The aim of the present invention is therefore to realise a saucepan which makes it possible for fatty cooking substances to be removed automatically from the food, and to be more exact at the desired moment during cooking, either in order to cook the food without it being in contact with the fatty substances, or in order to make it easier for the cooked food to be removed.

The invention also makes it possible for the saucepan to be adapted to suit the type of cooking which is to be done, or the food which is to be cooked, simply by replacing a removable saucepan plate with another plate of a different kind and/or structure.

The accompanying drawings show a frying pan 1 by way of example, which is delimited at its periphery by a widened rim 2 to which a handle 3 is fixed.

A plate 4 is placed on the upper face of the base of frying pan 1.

Figure 1:
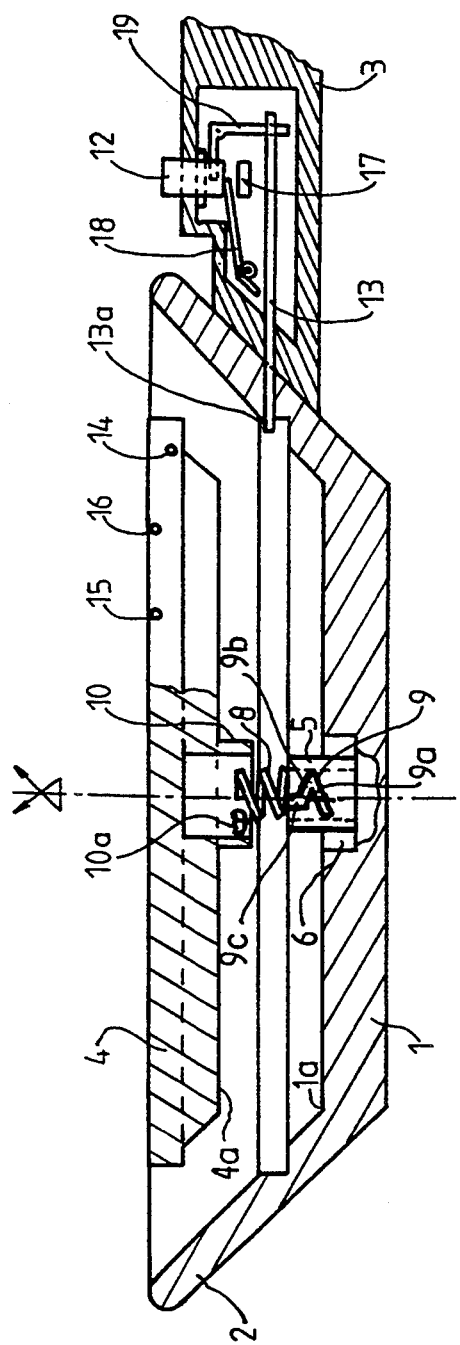
FIG. 1 is a view in axial section of a pan according to the invention.
Figure 4:
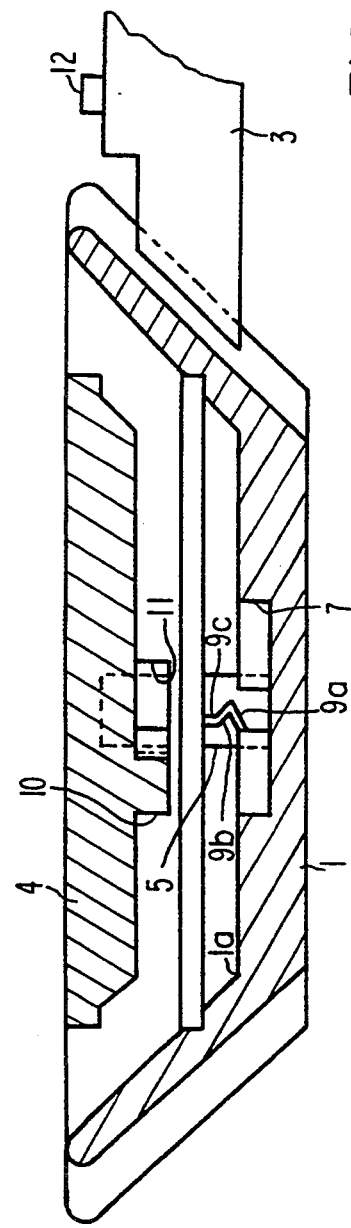
FIG. 4 is a non-axial sectional view of a part according to the invention.
Figure 2:
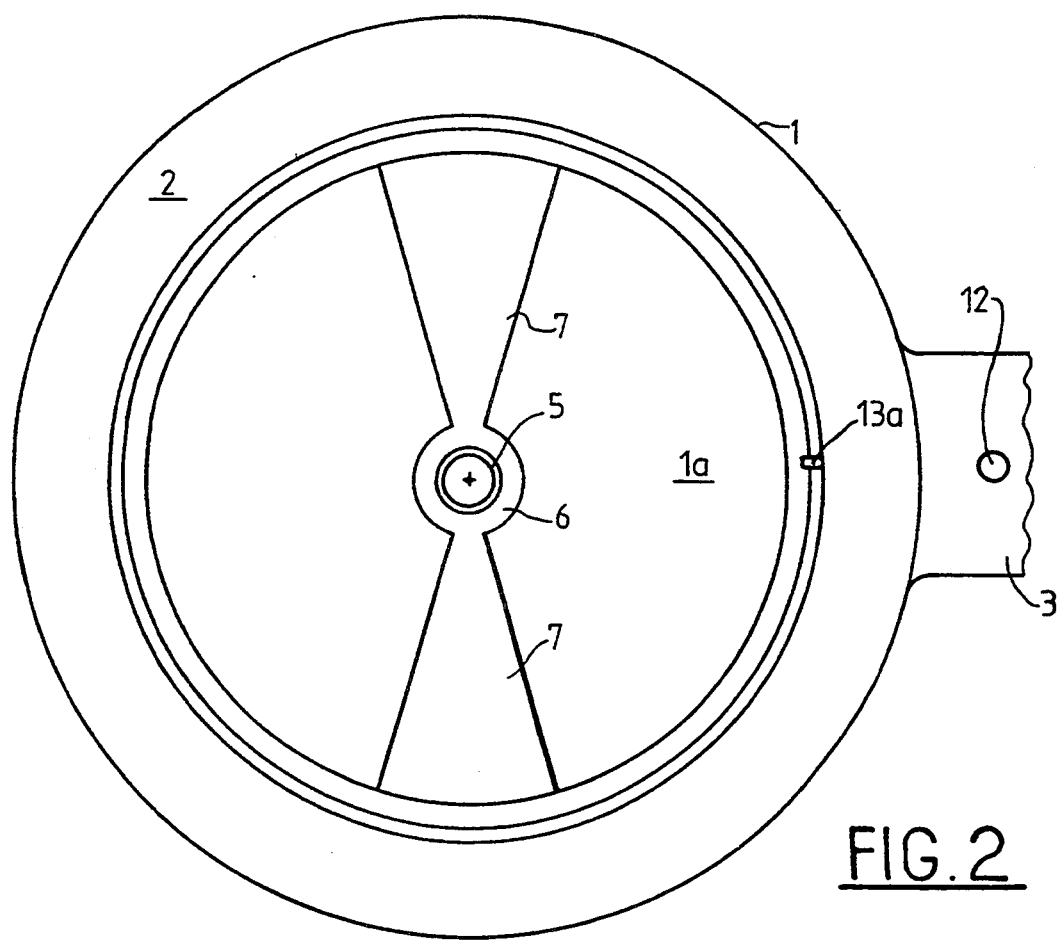
FIG. 2 is a plan view of the pan in FIG. 1, with the plate removed.
Figure 3:
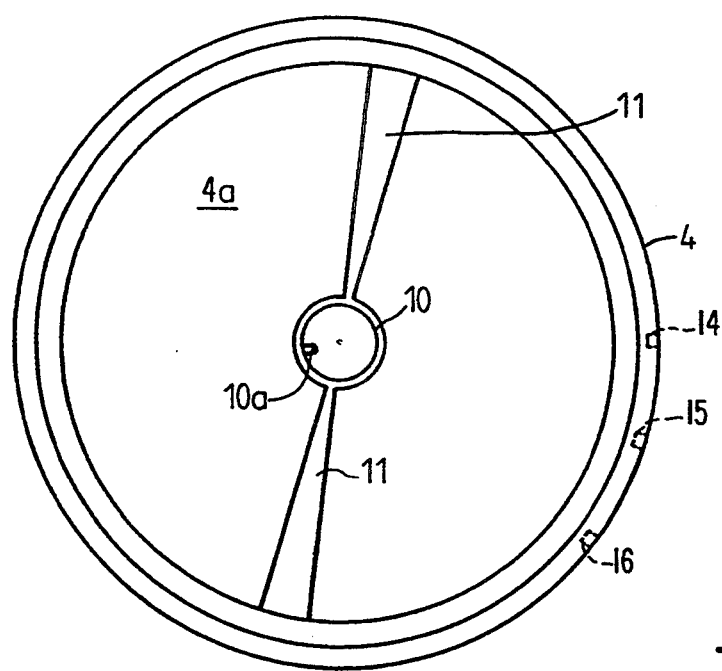
FIG. 3 is a bottom view of the plate of the pan in FIG. 1.

Provided in the centre of the base of frying pan 1 is a coaxial shaft 5 which is itself fixed in the base of frying pan 1 inside a circular recess 6 provided with two diametrally oppositely disposed extension portions 7 in the shape of circular sectors (see FIG. 2).

Inside the shaft 5 is a helical spring 8, whilst the outer face of the shaft 5 has an inclined ramp 9 with two zones 9a and 9b which are inclined in opposite directions, the free end of the upper zone 9b being extended by a vertical groove 9c which leads to the upper end of the shaft.

The bottom face of the plate 4 is provided with a coaxial ring 10, the internal diameter of which is slightly greater than the external diameter of the shaft 5 and the external diameter of which becomes lodged in the circular recess 6.

However, it will be noted that the shaft 5 and the ring 10 provided on the base 6 and plate 4 respectively can be reversed.

The inner face of the ring 10 is provided with a finger 10a which becomes lodged in the groove of the ramp 9.

The bottom face of the plate 4 is also provided with two diametrally oppositely disposed set-off portions 11 in the form of circular sectors leading to the outer face of the ring 10 at the centre of the plate 4.

The angle at the centre of these circular sectors 11 is significantly less than that of the grooves in the form of circular sectors 7 in the base of frying pan 1, so that when the sectors 11 are arranged in the sectors 7, the plate 4 is able to rotate by an angle which corresponds to the difference between the angles at the centre of the sectors 7 and 11. The radial edge of the sectors 7 thus constitutes contact abutment means which restrict the maximum rotational movement of the plate 4.

The handle 3 of the pan is provided with a knob 12 which constitutes a control member for a arm 13 which is slidably mounted in a corresponding hole in the wall 2 of the pan and of the shaft 3. The distal end 13a of the arm can thus project inside the pan, thereby forming a member for locking the plate 4, by being lodged in one or other of the peripheral holes 14, 15 and 16 which the plate has.

The knob 12 moves to the extent permitted by an abutment means 17, counter to a leaf spring 18, in order to actuate a bent lever 19 lodged in a hole in the arm 13. Thus, by pressing the knob 12, the arm 13 is controlled in such a way that it slides and withdraws its distal end 13a from one of the recesses 14, 15 or 16.

The pan works in the following way. Prior to use, the plate 4 which is coaxial to the base of frying pan 1 is pressed on the base counter to the spring 8, and the finger 10a comes to rest first of all in the groove 9c and then in the grooves 9b and 9a of the ramp 9. During this pressing movement, the knob 12 is pressed down in order to conceal the arm's distal end 13a inside the wall 2 of the pan.

When the finger 10a is at the bottom end of the zone 9a of the ramp, the bottom face of the plate 4a is in contact with the upper face of the base 1a of the pan; and the blind hole 14 is opposite the arm's locking distal end 13a. By releasing the knob 12, the arm's distal end 13a then moves into the recess 14 in order to be locked to the plate 4.

The desired amount of fat is used for cooking, and then at the desired moment the person using the frying pan presses the knob 12 to release the arm's distal end 13a. This causes the plate 4 to be lifted up and simultaneously rotated by the finger 10a moving from the bottom end of ramp zone 9a to the upper end of ramp zone 9a, considering the upper end of the zone 9a of the ramp 9, which, by the effect of the spring 8 which acts in such a way as to raise the plate 4.

The angle at the centre covered by the zone 9a of the ramp corresponds to the difference in angles at the centre of the circular sectors 7 and 11, and, therefore, when the finger 10a arrives at the top end of the ramp 9a, the grooves 11 come to bear on the opposite faces of the extension portions 7.

In this position too, the locking arm's distal end 13a is opposite the blind hole 15 of the plate 4, so that by releasing the knob 12 the arm's distal end 13a comes to lie in the blind hole 15 in order to lock the plate 4 in the new position where the plate is slightly moved away from the base 1 but still in contact with the base by virtue of the grooves 11.

In this position, fatty substances which were initially above the upper face of plate 4 flow over the edge of the plate onto the upper face of the pan's 7a and into the grooves 11.

The fatty substances are thus removed from the upper face of the plate 4 in such a way that it is possible to either continue the cooking without any fatty substances or in such a way that it is possible to facilitate removing the cooked food, without the problem of the fatty substance.

If the person using the pan once again presses the knob 12, the plate 4 is once again released, which, in this case, rotates in the opposite direction, due to the fact that the finger 10a is displaced in the zone of the ramp 9b.

If the person using the pan releases the knob 12 when the finger 10a is at the top end of the zone 9b, in this case the distal end 13a of the locking rod 13, is lodged in the third blind hole 16, the position of the blind hole 16 relative to the blind hole 15 corresponding to the angle at the centre covered by the zone 9b of the ramp 9. If the person using the pan presses the knob 12 again, the spring 8 will then vertically raise the plate 4 without rotating it, since the finger 10a moves in the vertical ramp 9c so as to then allow the plate to be removed to be replaced by a plate of a different type or structure.

I claim:

1. A saucepan comprising:
   (a) a base including an inner face which is delimited at its periphery by a rim,
   (b) a plate arranged adjacent the base's inner face, and
   (c) means for moving the plate away from the base, said means being provided between the plate and the base, said means being actuated by a control member, and said means comprising:
      i. a spring located between the plate and the base for moving the plate away from the base,
      ii. a cam ramp, and
      iii. a finger,
      wherein one of the ramp and the finger is positioned on the base and the other of said ramp and the finger is positioned on the plate, wherein the finger is adapted to fit into and move along the ramp, and wherein the spring, ramp and finger enable the plate to be simultaneously lifted and rotated by the actuation of the control member.

2. A saucepan according to claim 1, further comprising a means for releasing the plate such that the means for moving the plate can simultaneously lift and rotate the plate, said means for releasing the plate being controlled by the control member, said means for releasing the plate is provided on the saucepan and the plate, and said means for releasing the plate is controlled by the control member.

3. A saucepan according to claim 2, wherein the releasing means is formed by an arm slideably mounted on the saucepan so as to become lodged in a blind hole in an edge of the plate, and wherein the control member is formed by a linkage connected at one end to a control knob and at another end to the arm.

4. A saucepan according to claim 3, wherein the plate's periphery comprises at least two blind holes, and wherein an end of said arm protrudes from an inside face of the saucepan, said arm's end cooperates with at least one of the blind holes and serves as a means for controlling the angular positions of the plate.

5. A saucepan according to claim 2, further comprising an abutment means for restricting the simultaneous rotational and lifting movement of the plate, the abutment means comprising at least one recess which cooperates with a set-off portion, wherein the at least one recess is provided in one of the base and the plate and the set-off portion is provided on the other of the base and plate.

6. A saucepan according to claim 5, wherein the at least one recess is in the form of a circular sector.

7. A saucepan according to claim 6, wherein the set-off portion is provided under the plate and is in the form of a groove designed as a circular sector, and wherein the recess is provided in the base and is also in the form of a circular sector, said set-off portion forming an angle which is significantly less than an angle formed by the recess.

8. A saucepan according to claim 3, wherein the cam ramp is formed on a shaft fixed coaxially at the centre of the base, wherein the spring is in the form of a helical spring which is accommodated in the shaft, and wherein the finger which cooperates with the ramp is formed on a ring which is fixed to the plate and which coaxially embraces the shaft.

9. A saucepan according to claim 8, wherein the plate's periphery comprises at least two blind holes, and wherein an end of said arm protrudes an inside face of the saucepan, said arm's end cooperates with at least one of the blind holes and serves as a means for controlling the angular positions of the plate.

10. A saucepan according to claim 1, further comprising an abutment means for restricting the simultaneous rotational and lifting movement of the plate, the abutment means comprising at least one recess which cooperates with a set-off portion, wherein said at least one recess is provided in one of the base and the plate and said set-off portion is provided on the other of the base and the plate.

11. A saucepan according to claim 10, wherein the at least one recess is in the form of at least one circular sector.

12. A saucepan according to claim 11, wherein the set-off portion is provided under the plate and is formed by a groove designed as a circular sector, the groove forms an angle which is significantly less than an angle formed by the recess which is also designed as a circular sector located within the base.

13. A saucepan according to claim 1, wherein the cam ramp is formed on a shaft fixed coaxially at the centre of the base, wherein the spring is in the form of a helical spring which is accommodated in the shaft, and wherein the finger which cooperates with the ramp is formed on a ring which is fixed to the plate and which coaxially embraces the shaft.

14. A saucepan according to claim 13, wherein the cam ramp has two zones of inverse inclination, one of these zones forming an angle of rotation for the plate.

* * * * *